United States Patent Office.

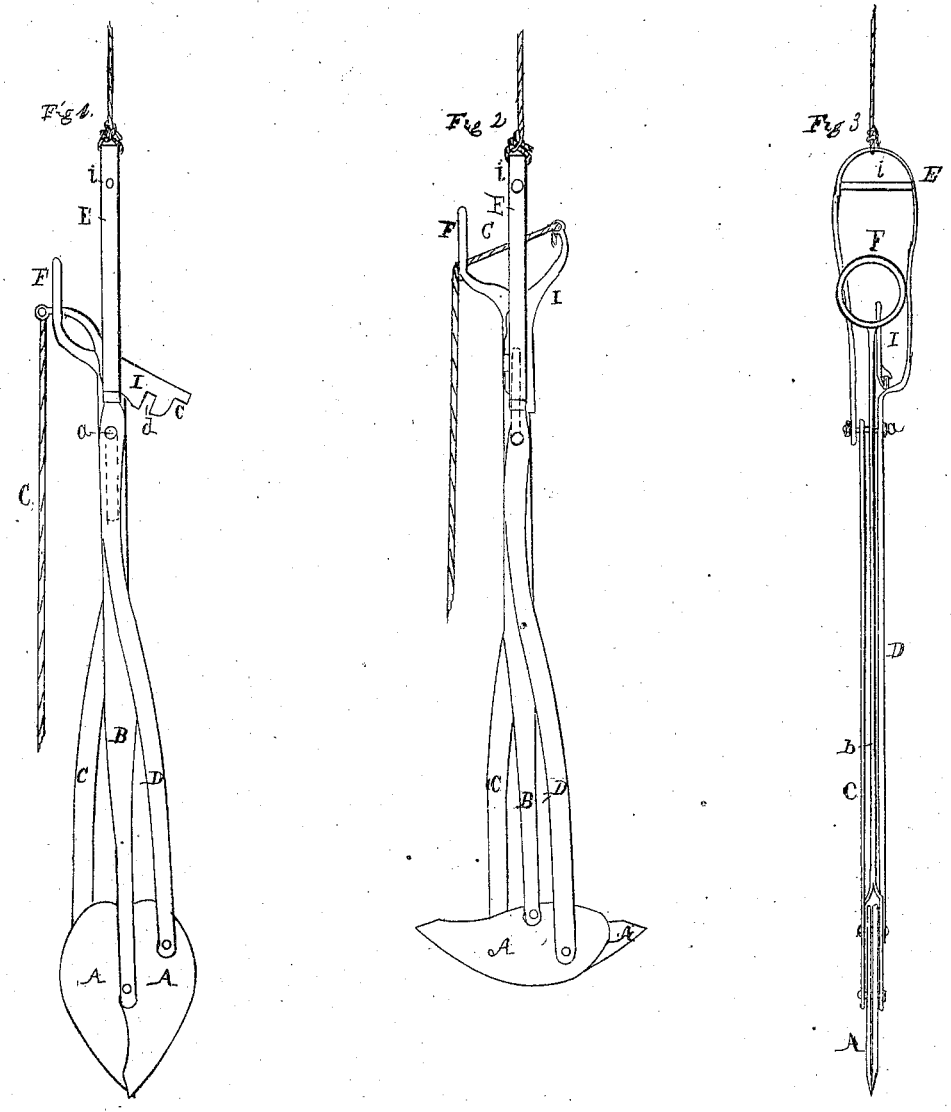

GEORGE M. ROBINSON, OF NEW WILMINGTON, PENNSYLVANIA.

Letters Patent No. 81,541, dated August 25, 1868.

IMPROVEMENT IN HAY-FORKS.

The Schedule referred to in these Letters Patent and making part of the same.

TO ALL WHOM IT MAY CONCERN:

Be it known that I, GEORGE M. ROBINSON, of New Wilmington, in the county of Lawrence, and in the State of Pennsylvania, have invented certain new and useful Improvements in Hay-Forks; and do hereby declare that the following is a full, clear, and exact description thereof, reference being had to the accompanying drawings, and to the letters of reference marked thereon.

The nature of my invention consists in the construction and general arrangement of a hay-fork, its object being a simple and efficient device for lifting and discharging hay, and which may be used also for cutting it.

In order to enable others skilled in the art to make and use my invention, I will now proceed to describe its construction and operation, referring to the annexed drawings, which form a part of this specification, and in which—

Figure 1 shows the cutters extended for entering the hay.

Figure 2, the same raised for lifting the hay, and

Figure 3 is a side view.

A A represent cutters, which are sharpened at their outer edges, and pivoted within the forked end of the centre-bar B. These cutters are also pivoted to the ends of the side-bars C and D, which are connected with each other, by means of one of them, D, being extended above the other, and bent over, forming the handle E, and being fastened together by means of a pin, $a$, which passes through the end of the handle E, the upper end of the bar C, a slot on the centre-bar B, and the upper part of the bar D, just below where the handle extends.

To the handle E, the rope for hoisting the fork is attached, and through said handle is a rod or bar, $i$, which prevents the rope from sliding down.

The centre-bar B extends upward a short distance from the connection with the side-bars in the handle, and terminates in a ring, F. On this extension, the lever I is pivoted, and a rope, $b$, passes from the upper end of said lever through the ring, so that it can be operated at any position.

The lower end of the trip-lever I has a projection, $c$, which enables it to catch on the handle, when the centre-bar B is raised, thus holding the cutters A A up while the hay is being raised.

The notch $d$ on the lever, near its end, will hold the cutters when raised only half way, so that they will answer for knives to cut the hay, if desired.

Having thus fully described my invention, what I claim as new, and desire to secure by Letters Patent, is—

The ring F, formed on the upper end of the slotted centre-bar B, in combination with the handle E, constructed as described, by the side-bar D being extended and bent over, substantially as herein set forth.

In testimony that I claim the foregoing, I have hereunto set my hand, this 11th day of June, 1868.

GEORGE M. ROBINSON.

Witnesses:
THEODORE A. SIGNER,
W. C. MOORE.